US008255565B2

(12) United States Patent
Kim et al.

(10) Patent No.: US 8,255,565 B2
(45) Date of Patent: Aug. 28, 2012

(54) PROXYING TRANSACTION METHOD FOR PROCESSING FUNCTION OF WIRELESS NODE IN PEER-TO-PEER OVERLAY NETWORK

(75) Inventors: Kyle Kim, Suwon-si (KR); Jin Sae Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 620 days.

(21) Appl. No.: 11/976,851

(22) Filed: Oct. 29, 2007

(65) Prior Publication Data

US 2008/0172465 A1      Jul. 17, 2008

(30) Foreign Application Priority Data

Jan. 12, 2007   (KR) .................. 10-2007-0004007

(51) Int. Cl.
   *G06F 15/16*   (2006.01)

(52) U.S. Cl. ................. 709/238; 709/205; 709/217

(58) Field of Classification Search .............. 709/238, 709/231, 220, 223–224, 226–228, 217–219, 709/239; 455/11.1, 13.1, 16, 511, 423, 15
See application file for complete search history.

(56) References Cited

U.S. PATENT DOCUMENTS

| 7,062,567 | B2 * | 6/2006 | Benitez et al. ................ 709/231 |
| 7,099,295 | B1 * | 8/2006 | Doyle et al. ................... 370/338 |
| 7,349,664 | B2 * | 3/2008 | Ochi et al. .................... 455/11.1 |
| 7,466,810 | B1 * | 12/2008 | Quon et al. ............... 379/201.01 |
| 7,787,611 | B1 * | 8/2010 | Kotelly et al. ........... 379/265.11 |
| 2002/0094813 | A1 * | 7/2002 | Koshimizu et al. ........... 455/436 |
| 2004/0110487 | A1 * | 6/2004 | Creamer et al. .............. 455/411 |
| 2004/0162871 | A1 | 8/2004 | Pabla et al. |
| 2004/0165536 | A1 | 8/2004 | Xu et al. |
| 2004/0249888 | A1 | 12/2004 | Berkey et al. |
| 2007/0022174 | A1 * | 1/2007 | Issa .............................. 709/217 |

FOREIGN PATENT DOCUMENTS

| KR | 10-2002-0046668 | 6/2002 |
| KR | 10-2002-0059066 | 7/2002 |
| KR | 20-0413131 | 3/2006 |
| KR | 10-2006-0071079 | 6/2006 |
| WO | WO 2005/094108 | 10/2005 |

* cited by examiner

*Primary Examiner* — Wing Chan
*Assistant Examiner* — Ruolei Zong
(74) *Attorney, Agent, or Firm* — NSIP Law

(57) ABSTRACT

A proxying process method for traffic of a wireless node and a system using the method are provided. The proxying process method includes: maintaining a virtual node which stores a communication packet from a server, destined for a first node; and transmitting the stored communication packet from the virtual node to a second node when a transmission request for the communication packet is transmitted to the first node by the second node.

14 Claims, 6 Drawing Sheets

FIRST NODE                    SECOND NODE

PROXYING TRANSACTION METHOD FOR PROCESSING FUNCTION OF WIRELESS NODE IN PEER-TO-PEER OVERLAY NETWORK

CROSS-REFERENCE TO RELATED APPLICATION

This application claims the benefit under 35 U.S.C. §119 (a) of a Korean Patent Application No. 10-2007-0004007, filed on Jan. 12, 2007 in the Korean Intellectual Property Office, the entire disclosure of which is hereby incorporated by reference.

BACKGROUND OF THE INVENTION

1. Field of the Invention

The present invention relates to a proxying processing method which processes a function of a wireless node on a peer-to-peer (P2P) overlay network, and a system using the method. More particularly, the present invention relates to a proxying processing method which can reduce a load of a network by exclusively transmitting a communication packet to the wireless node when the communication packet is required from another node to the wireless node, and providing the other node with the communication packet while bypassing the wireless node, and a system using the method.

2. Description of Related Art

Recently, a peer-to-peer (P2P) overlay network is provided to various communication services to make up for a defect of a server-client structure. Specifically, in the server-client structure, loads of all nodes are concentrated on a server side and thereby an overload of a network, a speed decrease, and a latency of a communication packet occur. To solve this problem, the P2P overlay network structure is provided. All join nodes use an upstream link and a downstream link to reduce a load occurring in the server side, and traffic is distributed on the network, thereby a general P2P overlay network structure may increase an efficiency of a network.

FIG. 1 illustrates a P2P overlay network.

Referring to FIG. 1, a first node 110 and a second node 120 transmit/receive a communication packet while communicating with a server 130. When the second node 120 requires data that is maintained by the first node 110, the second node 120 requests the first node 110 for the data, and receives a corresponding communication packet from the first node 110. In this instance, the server 130 receives a request of the second node 120 and thereby solves the overload occurring in a server side, whereas the overload occurring in the server side may not be solved in the server-client structure.

However, the P2P overlay network structure may also cause a problem of the overload of the network even though the P2P overlay network structure is provided to improve the server-client structure.

FIG. 2 illustrates a P2P overlay network including a wireless node.

In FIG. 2, the P2P overlay network includes at least one wireless node having a wireless channel, among join nodes. A first node 210, i.e. a mobile phone, transmits/receives a communication packet with a second node 220 or a server 230 using a wireless channel. Also, the P2P overlay network transmits/receives the communication packet in a wireless channel of the first node 210 and in a wired channel of the second node 220. In this instance, an overload may occur in the wireless channel of the first node 210 since the wireless channel of the first node 210 has less channel capacity than the wired channel of the first node 210. As a result of this, the speed of the network decreases and the latency of the communication packet occurring in the server-client structure occur on the P2P overlay network which includes the wireless node. Also, since the wireless node is operated using a battery having a comparatively low capacity, consumption of the battery increases due to the overload of the network.

Accordingly, there is a need for a new method and a system which can solve the above-described problem, and effectively embody the P2P overlay network.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a proxying processing method and proxying processing system which can exclusively perform transmitting a communication packet to a wireless node, and provide the communication packet when the communication packet is required from another node to the wireless node, and providing the other node with the communication packet while bypassing the wireless node.

An aspect of exemplary embodiments of the present invention also provides a proxying processing method and proxying processing system which can reduce a load being focused on a wireless node on a P2P overlay network.

An aspect of exemplary embodiments of the present invention also provides a proxying processing method and proxying processing system which can solve a problem of latency of a communication packet due to an overload of a wireless node on a P2P overlay network.

An aspect of exemplary embodiments of the present invention also provides a proxying processing method and proxying processing system which can improve an efficiency of a battery by reducing power consumption of a wireless node on a P2P overlay network.

According to an aspect of exemplary embodiments of the present invention, there is provided a proxying processing method for traffic of a wireless node including: maintaining a virtual node which stores a communication packet from a server, destined for a first node, and transmitting the stored communication packet from the virtual node to a second node when a transmission request for the communication packet is transmitted to the first node by the second node.

In an exemplary implementation of the present invention, there is provided a proxying processing system for traffic of a wireless node including: a virtual node generation unit generating a virtual node which stores a communication packet from a server, destined for a first node, and a packet transmission unit transmitting the stored communication packet from the virtual node to a second node when a transmission request for the communication packet is transmitted to the first node by the second node.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following detailed description, taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
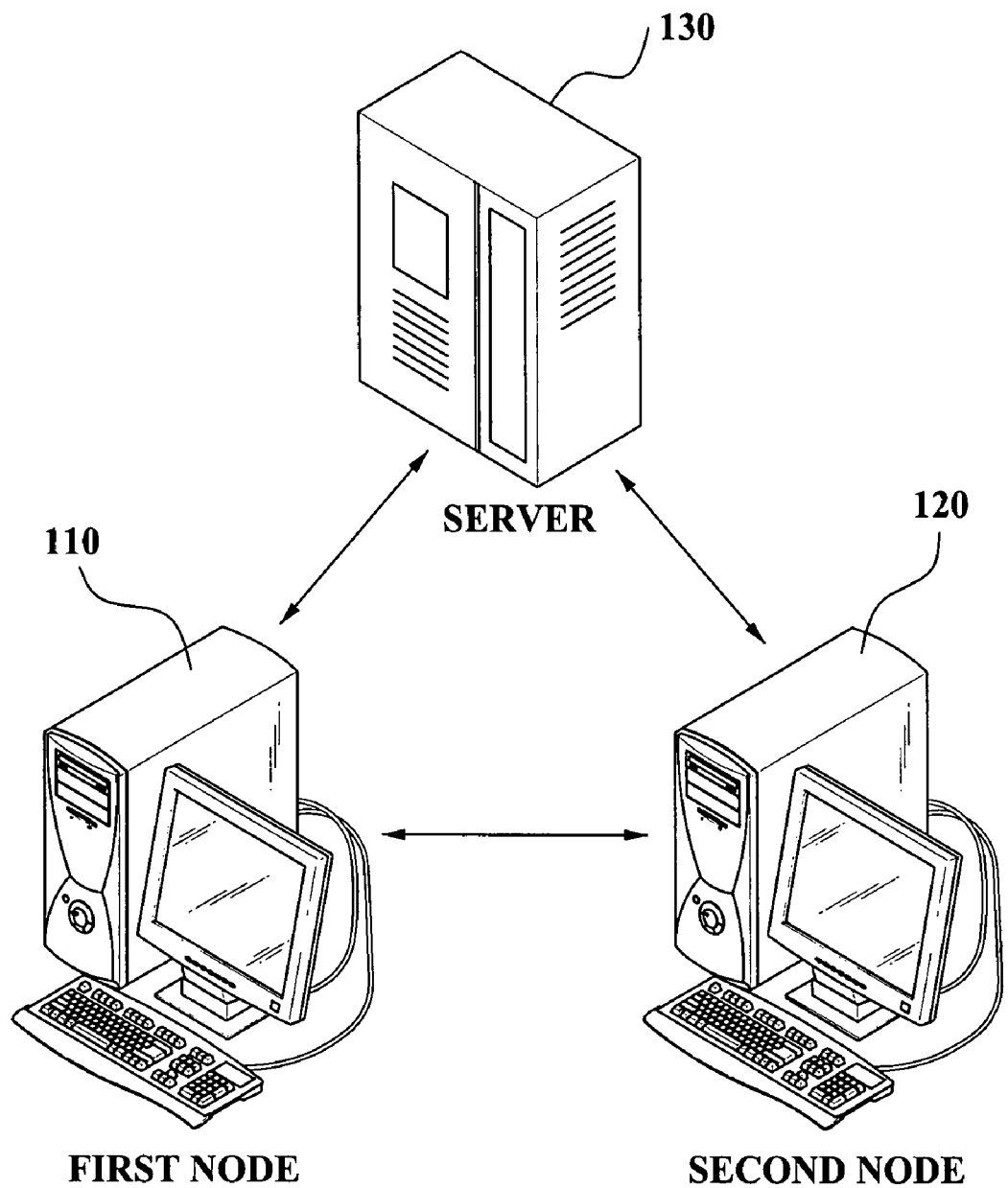
FIG. 1 illustrates a P2P overlay network according to a related art.
Figure 2:
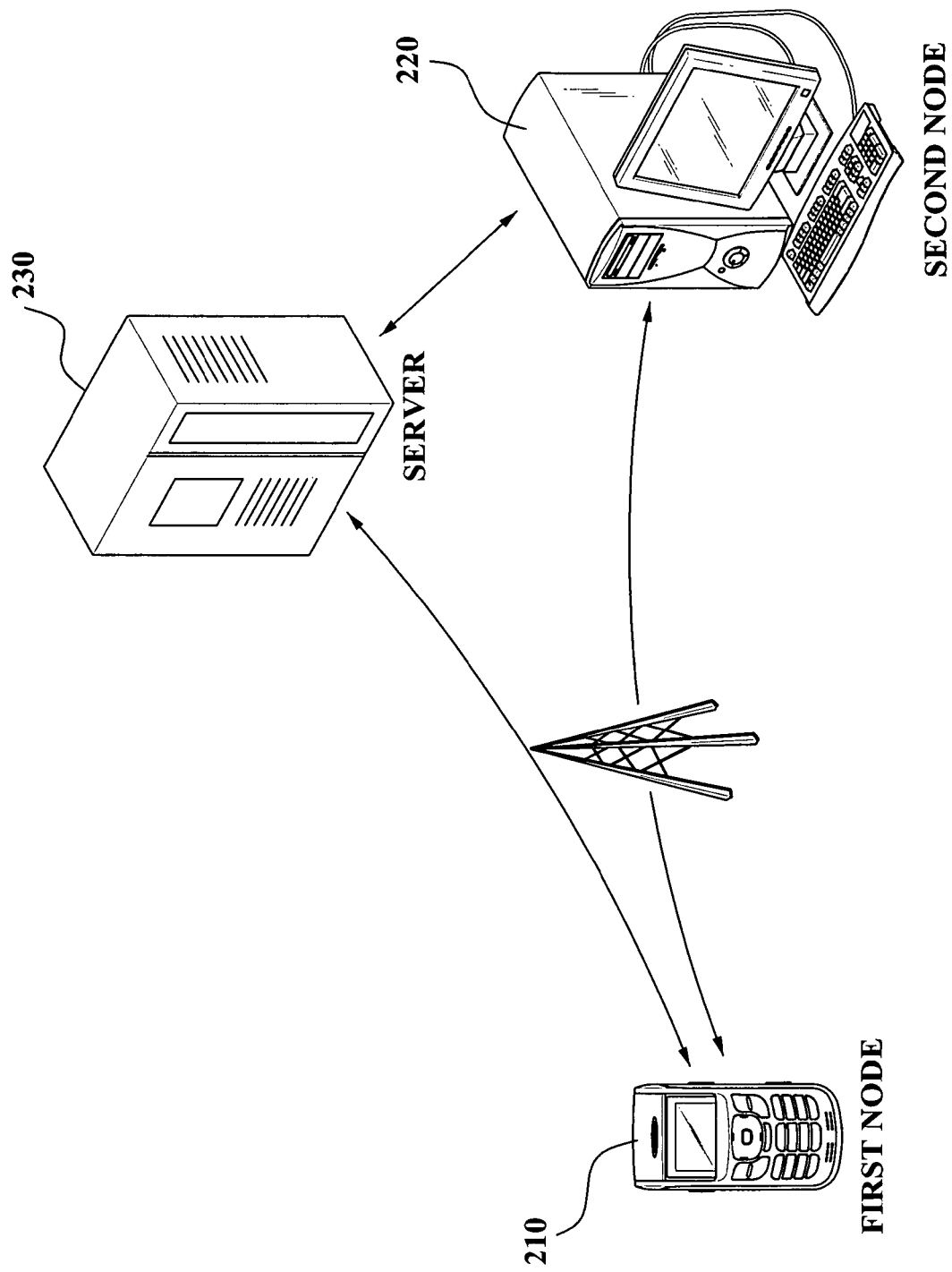
FIG. 2 illustrates a P2P overlay network including a wireless node according to a related art.
Figure 3:
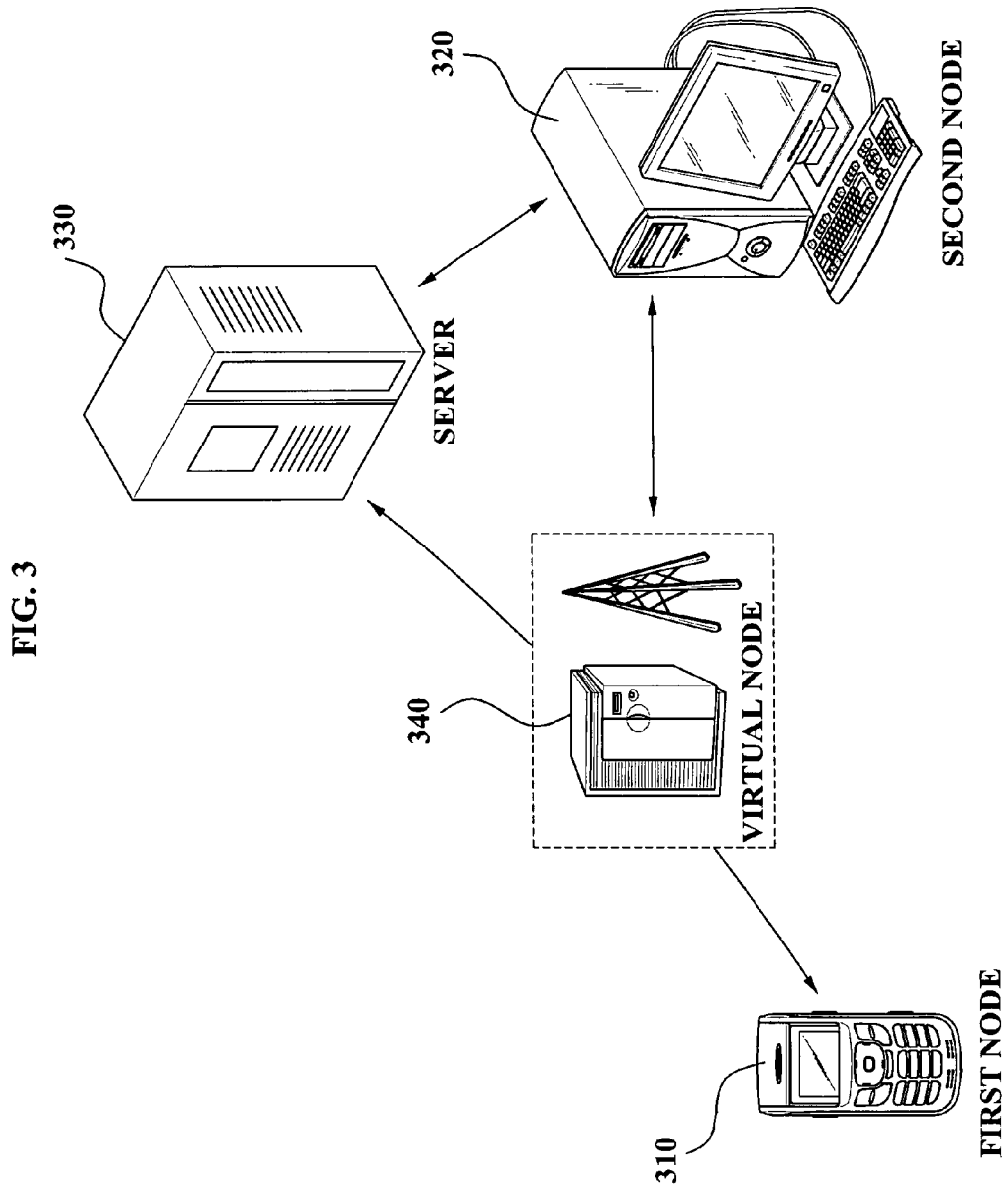
FIG. 3 illustrates a P2P overlay network applying a proxying processing system according an exemplary embodiment of the present invention.

FIG. 3 illustrates a P2P overlay network applying a proxying processing system according an exemplary embodiment of the present invention.

Referring to FIG. 3, the P2P overlay network includes a first node 310, a second node 320, and a server 330. The first node 310 may receive a communication packet from the server 330.

In an exemplary implementation, a proxying processing system according to the present invention stores the communication packet being transmitted from the server 330 to the first node 310. The proxying processing system may store the transmitted communication packet in a capture type while not having an influence on the transmitted communication packet. According to a feature of the P2P overlay network, when the second node 320 requests the communication packet received by the first node 310, the proxying processing system transmits the stored packet to the second node 320 while bypassing the first node 310, in response to the request by the second node 320. Namely, the first node 310 exclusively uses a downstream channel via a virtual node 340. The virtual node in the specification may include an access point (AP) or a base station (BS).

The server 330 and the virtual node 340 according to the exemplary embodiment of the present invention may be a wired/wireless environment that maintains an upstream channel and a downstream channel. Also, the virtual node 340 and the second node 320 may be a wired/wireless environment that maintains the upstream channel and the downstream channel, that is, a wireless environment is embodied only in the virtual node 340 and the first node 310, and the downstream channel is maintained in the wireless environment. Accordingly, the proxying processing system according to the present embodiment may reduce latency of a network by solving a problem of an overload frequently occurring in the wireless node, and may improve an efficiency of a battery of the wireless node by reducing power consumption of the wireless node.

Figure 4:
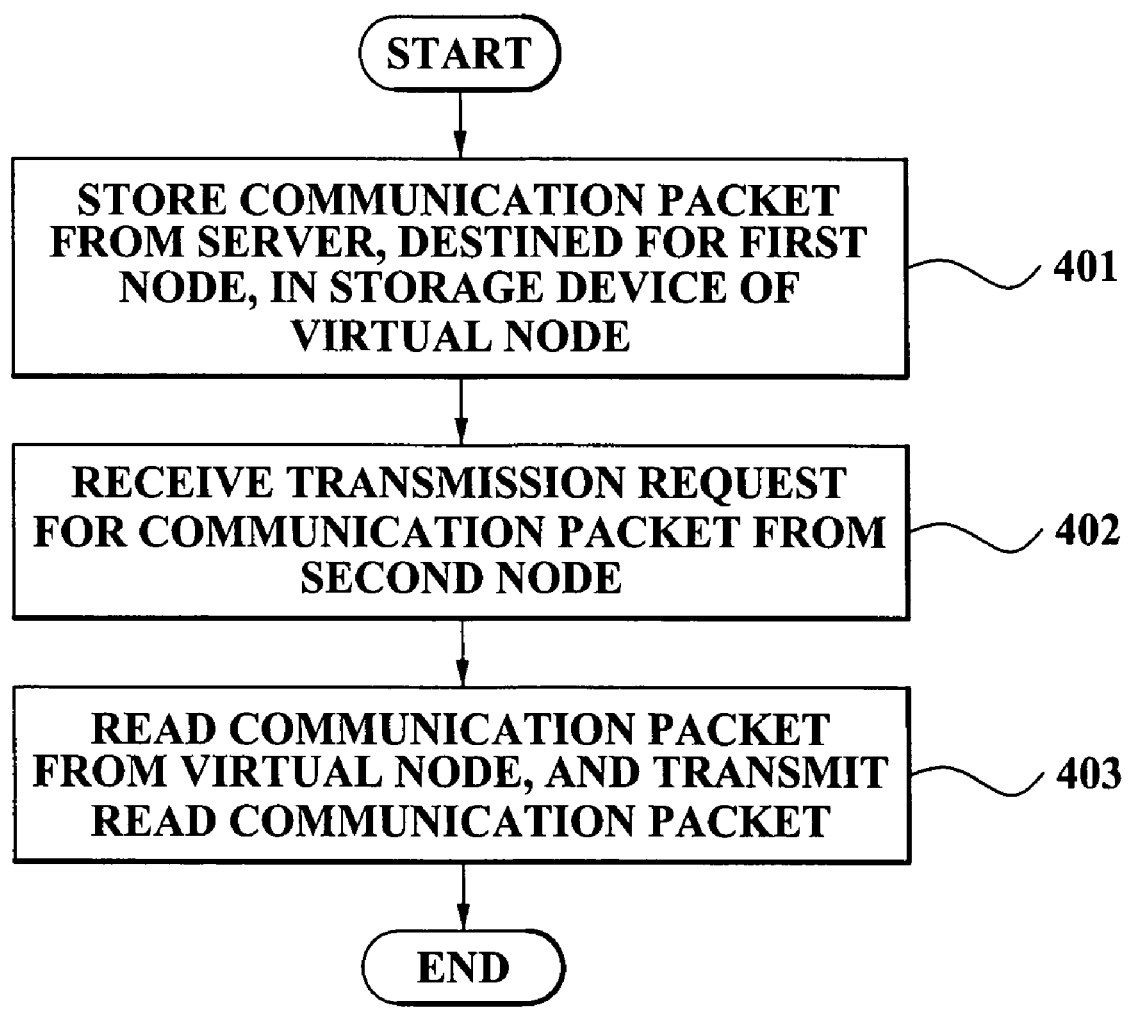
FIG. 4 is a flowchart illustrating a proxying processing method according an exemplary embodiment of the present invention.

FIG. 4 is a flowchart illustrating a proxying processing method according an exemplary embodiment of the present invention.

Referring to FIG. 4, in step 401, a proxying processing system according to an embodiment of the present invention stores a communication packet in a storage unit of a virtual node, the communication packet being transmitted from a server to a first node. In step 401, it is described the communication packet is transmitted from the server to a wireless node. Also, this may be understood as the communication packet, received from another node, is stored. Namely, any communication packet may be stored in the virtual node, included in the proxying processing system.

In step 402, the proxying processing system receives a transmission request for the communication packet from the second node. Specifically, the second node requiring the communication packet generates a predetermined query, and transmits the generated query to the proxying processing system to request the transmission of the communication packet, and the proxying processing system receives the query in step 402. In step 403, the proxying processing system reads the communication packet stored in the virtual node, and directly transmits the read communication packet to the second node while bypassing a first node. In step 403, the proxying processing system may suspend the transmission of the communication packet to the second node in the first node to directly transmit the communication packet while bypassing the first node. Also, the suspending of the transmission of the communication packet from the first node to the second node may be understood as preventing retransmission of the communication packet from the first node to the second node.

The proxying processing system according to the present invention checks a wireless node which is newly connected to a network, and determines whether the proxying process of the wireless node is possible. As an example, the proxying processing system receives a query associated with the proxying process from the first node which is newly connected to the network, and determines whether the proxying process is possible in response to the received query. The query is a signal querying whether to exclusively provide a downstream environment for the first node, between the first node and the virtual node. When the proxying processing is possible, the proxying process system generates the virtual node capable of providing the downstream environment for the first node according the query. As a result of the determination of whether the proxying process is possible, when the proxying process system is possible, the proxying process system receives a registration of an associated parameter from the first node and thereby generates the virtual node corresponding to the first node. The parameter may be used as information to identify the virtual node as the first node in an upstream environment on an entire network. In an exemplary implementation, the parameter may be information about a parent node, a child node, or a peer node of the first node.

According to an exemplary implementation of the present invention, the server and the virtual node may be connected with each other via a wired channel. The server transmits the communication packet to the virtual node in a wired communication scheme. The proxying processing system according to the present invention converts the communication packet being transmitted to the virtual node according to a protocol to transmit the converted communication packet to the first node. Also, the server and the virtual node may be connected with each other via a wireless channel. The server transmits the communication packet to the virtual node via a wireless communication method. In an exemplary implementation, the proxying processing system according to the present invention bypasses the communication packet being transmitted from the server to the virtual node, and transmits the bypassed communication packet to the wireless first node.

Accordingly, an overload of the network and latency of the communication packet occurring in a wireless node may be prevented since the virtual node in the proxying processing system performs the transmitting of the communication packet, the transmitting of the communication packet having been performed by the first node. Also, an efficiency of a battery may be improved by reducing power consumption of the wireless node.

Figure 5:
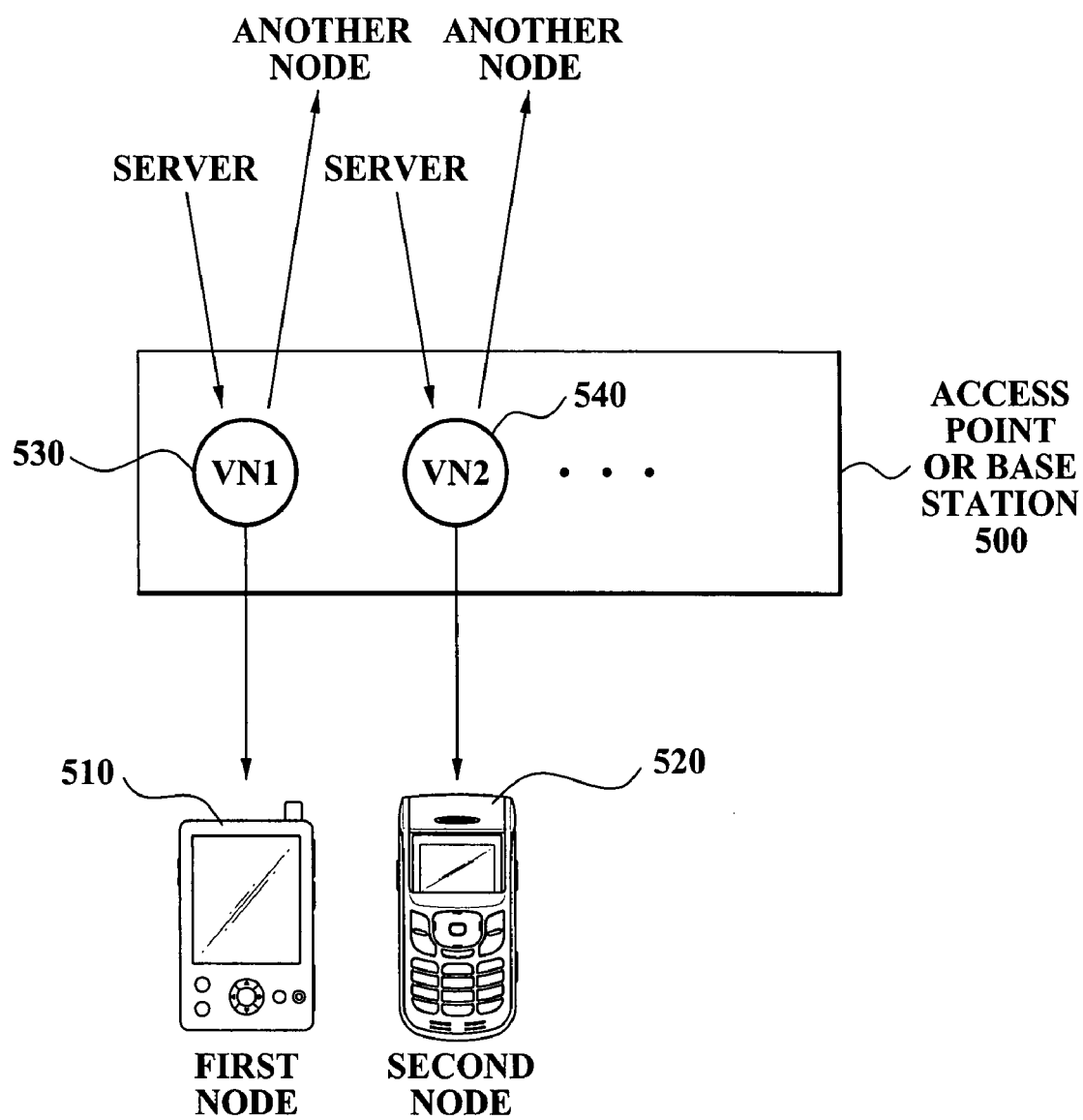
FIG. 5 illustrates a P2P overlay network applying a proxying processing system according another exemplary embodiment of the present invention.

FIG. 5 illustrates a P2P overlay network applying a proxying processing system according another exemplary embodiment of the present invention.

As illustrated in FIG. 3, a single wireless node and a single server, e.g. a second node, may be connected with each other via a single proxying processing system, however, in the description hereinafter, a plurality of wireless nodes and a plurality of servers may be connected with each other via a single proxying processing system. Referring to FIG. 5, an AP or a BS 500 includes a plurality of virtual nodes, e.g. virtual node 1 (VN1) 530 and virtual node 2 (VN2) 540. A first node 510 and a second node 520 using a wireless communication method respectively correspond to the VN1 530 and VN2 540. A communication packet transmitted from the server is transmitted to the first node 510 as soon as the communication packet is stored in the VN1 530, and a communication packet transmitted from the server is transmitted to the second node 520 as soon as the communication packet is stored in the VN2 540. Specifically, when a transmission request for the communication packet to transmit to the first node 510 or the second node 520 from another node, the VN1 530 or the VN2 540 refers to the transmission request to forward the stored communication packet to the other node when the transmission request is transmitted from a node corresponding to the VN1 530 or the VN2 540, instead of the first node 510 or the second node 520. Subsequently, the proxying processing method according to the present invention may be implemented between the plurality of wired/wireless nodes and the plurality of wireless nodes.

Figure 6:
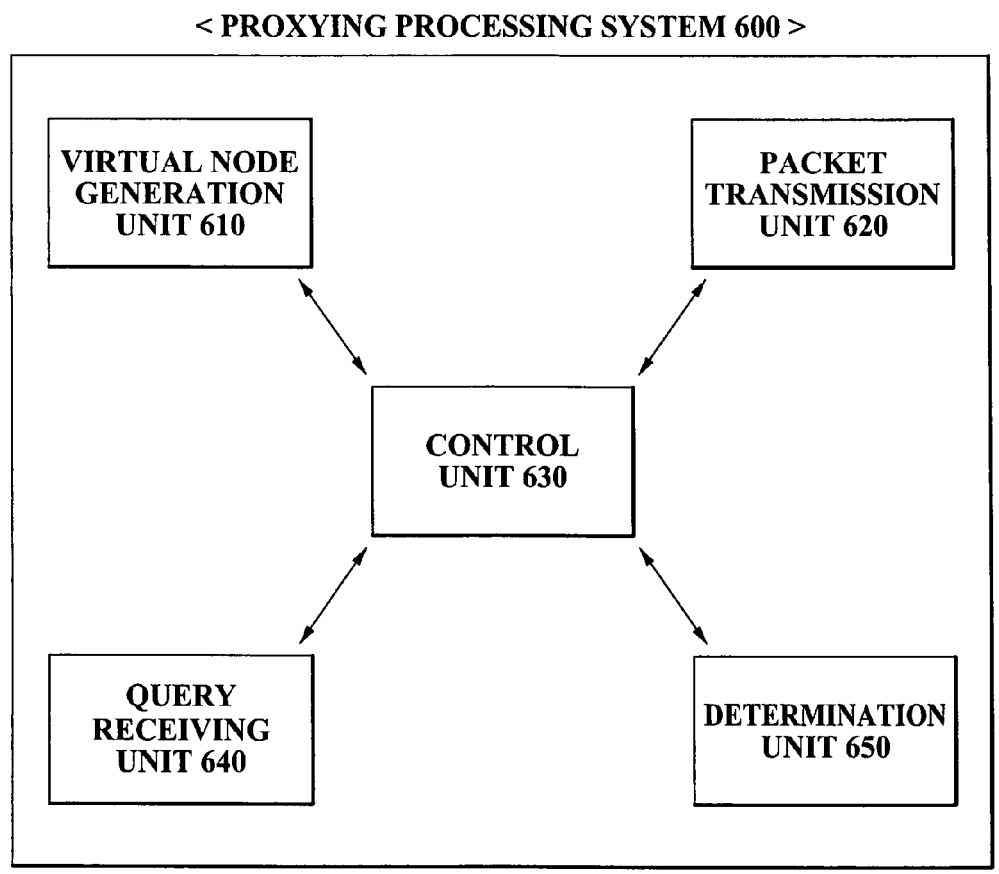
FIG. 6 is a block diagram illustrating an inner configuration of a proxying processing system according to an exemplary embodiment of the present invention.

FIG. 6 is a block diagram illustrating an inner configuration of a proxying processing system 600 according to an exemplary embodiment of the present invention.

Referring to FIG. 6, the proxying processing system 600 includes a virtual node generation unit 610, and a packet transmission unit 620. The proxying processing system 600 further includes a control unit 630 which transmits a processing order to each configuration module of the proxying processing system 600.

The virtual node generation unit 610 stores a communication packet from a server, destined for a wireless first node, and generates a virtual node to transmit the communication packet to the first node. When the generated virtual node is connected with the server via a wired channel, the virtual node may convert the wireless communication packet according to a protocol to transmit the converted wireless communication packet to the first node. When the generated virtual node is connected with the server via a wireless channel, the virtual node may bypass the first node without transmitting the wireless communication packet being transmitted from the server to the first node.

Also, the virtual node may include an AP and a BS. When the wireless first node is a mobile phone, the virtual node includes the BS, and when the wireless first node is a terminal such as a notebook, the virtual node includes the AP. The virtual node includes a storage device such as a hard disc to store the communication packet transmitted from the server, destined for the first node.

The packet transmission unit 620 transmits the stored communication packet to the second node when a transmission request for the communication packet is transmitted to the first node by the second node. The packet transmission unit 620 forwards the stored communication packet to the second node while bypassing the first node when the transmission request is received from the second node. The first node is not required to forward the communication packet to the second node due to an upstream environment. As an example, the packet transmission unit 620 suspends the transmitting of the communication packet being stored in the first node to the second node, and transmits the communication packet to the second node while bypassing the first node. For this, the packet transmission unit 620 may prevent retransmission of the communication packet by the first node.

Subsequently, a load of a network and latency of the communication packet may be reduced since the proxying processing system 600 performs the transmitting of the communication packet which is performed by the first node. Also, the proxying processing system 600 may reduce a round trip delay of the communication packet. That is, a P2P overlay network applying the proxying processing system 600 may reduce a required time to transmit the communication packet due to a reduced hop count. Also, the proxying processing system 600 may improve an efficiency of a battery of the wireless node by reducing power consumption of the wireless node.

The proxying processing system 600 according to the present invention may further include a query receiving unit 640 and a determination unit 650.

The query receiving unit 640 receives a query associated with a proxying process from the first node, and determines whether the proxying process is possible in response to the received query. As a result of the determination of the determination unit 650, when the proxying process is possible, the virtual node generation unit 610 generates the virtual node which can provide the first node with a downstream environment according to the query.

In another exemplary implementation, as the result of the determination unit 650, when the proxying process is possible, the proxying processing system 600 may further include a parameter registration unit (not shown) which registers a parameter associated with the first node. The virtual node generation unit 610 may generate the virtual node according to the registered parameter. The parameter may be used as information to identify the virtual node as the first node in the upstream environment on an entire network.

The proxying process method according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to exemplary embodiments of the present invention, it is possible to exclusively perform transmitting a communication packet to a wireless node, and provide the communication packet when the communication packet is required from another node to the wireless node, and providing the other node with the communication packet while bypassing the wireless node.

Also, according to exemplary embodiments of the present invention, it is possible to reduce a load being focused on a wireless node on a P2P overlay network.

Also, according to exemplary embodiments of the present invention, it is possible to solve a problem of latency of a communication packet due to an overload of a wireless node on a P2P overlay network.

Also, according to exemplary embodiments of the present invention, it is possible to improve an efficiency of a battery by reducing power consumption of a wireless node on a P2P overlay network.

While the invention has shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A proxying process method of a proxying process system for traffic of a wireless node, the method comprising:
    receiving a query associated with a proxying process, from a first node;
    generating a virtual node corresponding to the first node;
    capturing, at the virtual node, a communication packet that is sent from a server and that is destined for the first node;
    receiving, at the virtual node, a transmission request for the communication packet from a second node, which is different from the first node;
    suspending the transmission of the communication packet from the first node to the second node by the virtual node; and
    transmitting the stored communication packet by the virtual node instead of the first node,
    wherein the virtual node captures the content of the communication packet while the first node also receives the transmission of the communication packet, and
    in response to the server communicating with the virtual node via a wire, the method further comprises converting the transmitted communication packet according to a wireless protocol to transmit the converted communication packet to the first node.

2. The proxying process method of claim 1, wherein the suspending of the transmitting of the communication packet to the second node prevents retransmission of the communication packet by the first node.

3. The proxying process method of claim 1, further comprising:
    determining whether a service with respect to the proxying process is possible in response to the received query.

4. The proxying process method of claim 3, wherein the determination of whether the service with respect to the proxying process is possible comprises:
    registering a parameter associated with the first node when the proxying process is possible as a result of the determination, thereby generating the virtual node corresponding to the first node.

5. The proxying process method of claim 1, further comprising:
    bypassing the transmitted communication packet directly to the first node when the server wirelessly communicates with the virtual node.

6. The proxying process method of claim 1, wherein the virtual node is an access point (AP) or a base station (BS).

7. A proxying process system for traffic of a wireless node, the system comprising:
    a query receiving unit receiving a query associated with a proxying process from a first node;
    a virtual node generation unit for generating a virtual node corresponding to the first node which captures a communication packet that is transmitted from a server and that is destined for the first node; and
    a packet transmission unit for receiving a request for transmission of the communication packet from the first node to a second node, which is different from the first node, via the virtual node, for suspending the transmission of the communication packet from the first node to the second node by the virtual node, and for transmitting the stored communication packet to the second node via the virtual node instead of the first node,
    wherein the virtual node captures the communication packet while the first node also receives the transmission of the communication packet, and
    in response to the server communicating with the virtual node via a wire, the packet transmission unit is further configured to convert the transmitted communication packet according to a wireless protocol to transmit the converted communication packet to the first node.

8. The proxying process system of claim 7, wherein the packet transmission unit prevents retransmission of the communication packet by the first node to suspend the transmitting of the communication packet to the second node.

9. The proxying process system of claim 7, further comprising:
    a determination unit determining whether a service with respect to the proxying process is possible in response to the received query.

10. The proxying process system of claim 7, further comprising:
    a parameter registration unit registering a parameter associated with the first node when the proxying process is possible as a result of the determination,
    wherein the virtual node generation unit generates the virtual node corresponding to the first node.

11. The proxying process system of claim 7, wherein, in the packet transmission unit, when the server wirelessly communicates with the virtual node, the system bypasses the transmitted communication packet directly to the first node when the server wirelessly communicates with the virtual node.

12. The proxying process system of claim 7, wherein the virtual node is an access point (AP) or a base station (BS).

13. The method of claim 1, wherein the communication packet is sent from the server to the first node, through at least one intermediate node including the virtual node.

14. A base station comprising:
    a plurality of virtual nodes, each node configured to capture content of a communication packet transmitted to a respective node, from among a plurality of wireless nodes, while the respective node also receives the transmission of the communication packet;

a storage configured to store the captured communication packet; and a packet transmitter configured to transmit the communication packet to a second node, in response to the second node transmitting a request for the communication packet to the first node, wherein the plurality of virtual nodes connect the plurality of nodes with a plurality of servers, and in response to the plurality of servers communicating with the virtual node via a wire, the packet transmitter is further configured to convert the transmitted communication packet according to a wireless protocol to transmit the converted communication packet to the first node.

* * * * *